Figures 1, 2:
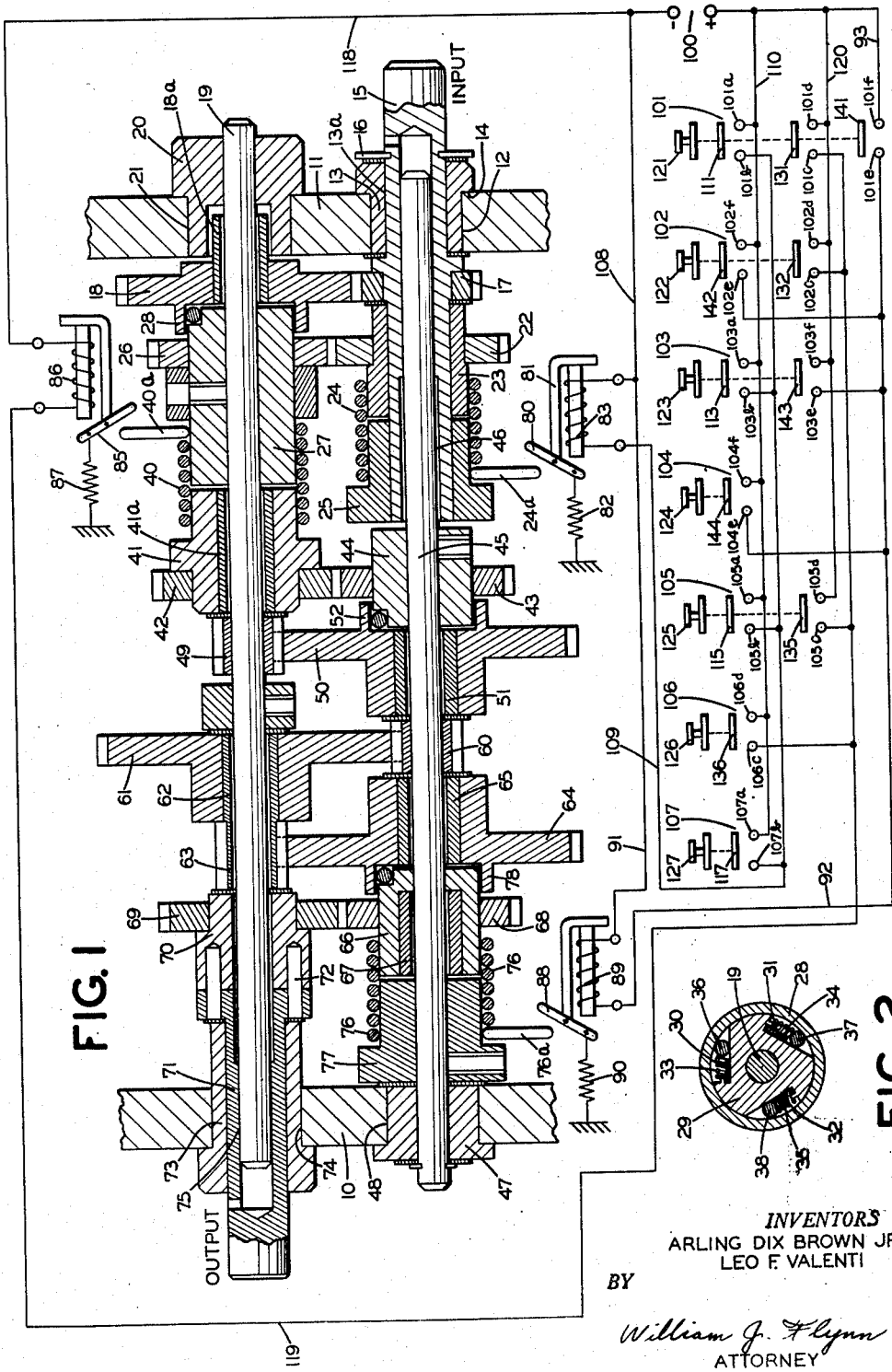

Jan. 14, 1958  A. D. BROWN, JR., ET AL  2,819,624
VARIABLE SPEED TRANSMISSION
Filed July 1, 1953

INVENTORS
ARLING DIX BROWN JR.
LEO F. VALENTI
BY
William J. Flynn
ATTORNEY

United States Patent Office 2,819,624
Patented Jan. 14, 1958

2,819,624

VARIABLE SPEED TRANSMISSION

Arling Dix Brown, Jr., East Cleveland, and Leo F. Valenti, Garfield Heights, Ohio, assignors, by mesne assignments, to Clevite Corporation, Cleveland, Ohio, a corporation of Ohio Application July 1, 1953, Serial No. 365,368

14 Claims. (Cl. 74—368)

This invention relates to a variable speed transmission.

It is an object of this invention to provide a novel and improved transmission which is readily selectively controllable remotely to produce any one of a plurality of output speeds over a wide range.

It is also an object of the present invention to provide a new and improved remote controlled variable speed drive for advancing the recording chart associated with a magnetic pen recorder, such as that shown in U. S. Letters Patent 2,478,329 to Shaper.

In conventional transmissions of the general type wherein the output speed is controlled selectively to have any particular one of a number of definite ratios with respect to the input speed, a common characteristic of such transmissions is that relatively high operating forces are required to operate the clutches in the transmission to change the output speed. This is because operation of the clutches is opposed by the load on the transmission. This is particularly disadvantageous where remote control operation of the transmission is desired, since in the case of these transmissions the operating forces necessary for the successful performance of the clutch operating mechanisms become excessive in practice. These disadvantages are avoided in the present invention by the provision in the transmission of clutch arrangements effective to vary selectively the output speed without the necessity of large operating forces on the clutches to effect the desired speed changes.

Therefore, it is also an object of this invention to provide a novel, remote controlled, variable speed transmission having clutch arrangements which are not required to oppose the load on the transmission in order to effect speed changes, thereby enabling small operating forces on the clutches to be effective to change the output speed of the transmission.

Another object of this invention is to provide a variable speed drive of novel, space-saving construction which minimizes manufacturing tolerances and assembly problems.

A further object of this invention is to provide a novel variable speed drive capable of producing any one of several output speeds over a wide range through operator-controlled variation of increments of speed change in the transmission, all in a mechanism in which there are only two axes of rotation.

Other and further objects and advantages of the present invention will be apparent from the following description of a preferred embodiment thereof, which is shown in the accompanying drawing to illustrate the principles of this invention.

In the drawing,

Fig. 1 is a longitudinal section through the variable speed transmission of the present invention and showing schematically the control circuit for this transmission; and Fig. 2 is a transverse cross section through one of the overrunning clutches in the Fig. 1 transmission.

The illustrated embodiment of the present invention represents a specific variable speed transmission designed for driving the recording chart associated with a magnetic pen recorder of the general type shown in U. S. Letters Patent 2,478,329 to Shaper. While the primary utility for the transmission is for this particular purpose, it is to be understood that the transmission of the present invention is not limited in its utility to this specific purpose but may be used wherever it is found desirable to employ a transmission having the characteristics of the present invention.

Referring to Fig. 1, the support housing for the transmission includes a pair of spaced parallel end plates 10, 11. End plate 11 is formed with a first circular hole 12 at which is located a bearing sleeve 13 having a transverse flat annular shoulder 14 abutting against the outer face of the end plate 11. Sleeve 13 is formed with an axial passage 13a through which the input drive shaft 15 extends snugly, yet rotatably. A snap ring 16 serves to lock the drive shaft axially relative to sleeve 13 and the end plate 11.

At the inner side of end plate 11 a small gear 17 is mounted rigidly on drive shaft 15 to rotate in unison therewith at all times. Gear 17 meshes with a larger gear 18 carried on a sleeve 18a which is free turning on first intermediate shaft 19. Shaft 19 is supported rotatably by a bearing 20 secured at hole 21 in end plate 11 and extends parallel to input shaft 15 in spaced relation therefrom. Gears 17, 18 provide a reduction gearing between input shaft 15 and first intermediate shaft 19.

Another gear 22 is secured rigidly to a hub 23 mounted to turn freely on input shaft 15. A helical coil spring 24 encircles hub 23 and a hub 25 secured rigidly to input shaft 15 to rotate therewith at all times, the spring 24 forming a clutch between these hubs. In the normal direction of rotation of input shaft 15, the rotation of hub 25 tends to wind helical spring 24 tightly about hubs 25 and 23, thereby establishing a direct drive from input shaft 15 to gear 22. However, when spring 24 is restrained against rotation with hub 25 helical spring 24 tends to unwind and the direct drive from shaft 15 through spring clutch 24 to gear 22 is disconnected.

Gear 22 meshes with an identical gear 26 mounted rigidly on a hub 27 secured to first intermediate shaft 19, so that gear 26 rotates with shaft 19 at all times.

To permit shaft 19 to overrun the reduction gearing 17, 18 when driven at higher speed through gear 22, there is provided an overrunning clutch of conventional design disposed between gears 18 and 26. As shown in Fig. 2, this overrunning clutch includes an annular sleeve 28, which projects axially from one end of gear 18 (Fig. 1), surrounding a plate 29 integral with hub 27 and formed with three peripheral ball-receiving recesses 30–32. Compression coil springs 33–35 located in these recesses bias the respective balls 36–38 away from the larger ends of these recesses. In the normal direction of rotation of shaft 19 (clockwise in Fig. 2), when shaft 19 is driven at a higher speed through gears 22, 26 than the speed of gear 18 the ball-carrying plate 29 is free to slip past sleeve 28, the balls 36–38 permitting this action to take place.

In the operation of the above-described portion of the present transmission, when it is desired to establish the lower speed increment of the drive, the helical spring 24 is restrained against rotation with input shaft 15, thereby disconnecting gear 22 from this shaft.

Gear 17 on the input shaft 15 drives the other gear 18 of the reduction gearing, and gear 18 drives hub 27 through clutch 28–38, to drive first intermediate shaft 19 at the reduced speed determined by the gear ratios of the reduction gearing 17, 18. In this instance, this reduction gearing provides a speed reduction of 1:2 from input shaft 15 to first intermediate shaft 19. For the higher speed drive, helical spring 24 is permitted to rotate with input shaft 15 to thereby connect this shaft directly to gear 22. Gear 22, in turn, drives gear 26 to rotate first intermediate shaft 19 at the same speed as input shaft 15. At this time, gear 18 of the reduction gearing continues to be turned by gear 17, but at a lower speed than gear 26. However, clutch 28-38 permits the rigid assembly of first intermediate shaft 19, hub 27 and gear 26 to overrun reduction gear 18 at the higher speed imparted to this assembly by the drive through gear 22.

The next increment of speed change in the transmission is effected through the following mechanism, referring to Fig. 1: A helical spring clutch 40 encircles hub 27 and another hub 41 mounted on sleeve 41a to turn freely on shaft 19. Gear 42 is secured fixedly on hub 41. Gear 42 drives a gear 43 secured to a hub 44 attached to a second intermediate shaft 45 to rotate therewith. Shaft 45 at one end is received rotatably within an axial recess 46 formed in the inner end in input shaft 15. At its opposite end, shaft 45 is rotatably supported by a shouldered bearing 47 mounted at a hole 48 in the end plate 10. Obviously, shaft 45 is coaxial with the input shaft 15 and the respective end plate holes 12 and 48 are in alignment.

First intermediate shaft 19 also carries rigidly a small gear or pinion 49 which drives a large gear 50 carried by a sleeve 51 to turn freely on second intermediate shaft 45. For clutching gear 50 to shaft 45 at the lower increment of speed, but permitting shaft 45 to overrun gear 50 at the higher speed increment, there is provided an overrunning clutch 52 disposed between gear 50 and hub 44. This overrunning clutch is preferably identical in construction and mode of operation to that shown in Fig. 2 and already described in detail.

With this arrangement, for a given speed of rotation of first intermediate shaft 19, the second intermediate shaft 45 may be driven at either of two speeds. For the lower speed increment, helical spring clutch 40 is restrained against rotation with hub 27, thereby disconnecting gear 42 from shaft 19. Shaft 19 drives shaft 45 through the 1:5 reduction gearing provided by pinion 49 and gear 50, the clutch 52 and hub 44. At the higher speed increment, helical spring clutch 40 is permitted to rotate with hub 27 and connects gear 42 directly to first intermediate shaft 19. Gear 42 drives gear 43, which, in turn, drives second intermediate shaft 45 at the same speed as shaft 19 because of the 1:1 ratio of gears 42 and 43. At this higher speed increment, clutch 52 permits the rigid assembly of second intermediate shaft 45, hub 44 and gear 43 to overrun the more slowly rotating gear 50 of the reduction gearing 49, 50.

The final increment of speed change in the transmission is provided by reduction gearing which includes the pinion 60 secured to second intermediate shaft 45, large gear 61 driven by pinion 60 and carried by a sleeve 62 which turns freely on first intermediate shaft 19, a pinion 63 also carried on this sleeve and rotating in unison with gear 61, and a large gear 64 driven by pinion 63 and carried on a bushing 65 mounted to rotate freely on second intermediate shaft 45.

A hub 66 mounted on bushing 67 to turn freely on shaft 45 carries a gear 68 which meshes with a gear 69 secured to a hub 70 which turns freely on first intermediate shaft 19. Hub 70 drives the output shaft 71 through a suitable coupling 72. As shown in Fig. 1, output shaft 71 extends through a shouldered sleeve bearing 73 located at a hole 74 in the end plate 10. At its inner end, the output shaft is formed with an axial recess 75 for receiving and supporting rotatably the adjacent end of first intermediate shaft 19. Thus, shafts 19 and 71 are coaxial with one another and the end plate holes 21 and 74 are aligned with one another.

A helical spring clutch 76 forms a coupling between hub 66 and a hub 77 secured rigidly to second intermediate shaft 45. In the normal direction of rotation of shaft 45, spring 76 winds tightly about hubs 77 and 66 to clutch these elements together and impart a direct drive from second intermediate shaft 45 direct to gear 68. At this time, the overrunning clutch 78, which acts between gear 68 and the final gear 64 of the reduction gearing 60, 61, 63, 64 and which is identical in construction and mode of operation to that shown in Fig. 2, permits gear 68 to overrun the lower speed drive imparted by the reduction gearing 60, 61, 63, 64. When the direct drive from shaft 45 to gear 68 is disconnected, by restraining helical spring 76 against rotation, the drive to gear 68 is through reduction gearing 60, 61, 63, 64 and clutch 78. In this low speed increment, the reduction gearing 60, 61, 63, 64 provides a 1:25 speed change from second intermediate shaft 45 to output shaft 71. The drive from shaft 45 through spring clutch 76 and gears 68, 69 to the output shaft is at a 1:1 speed ratio.

For selectively controlling the operation of the helical spring clutches 24, 40 and 76, and thus determining the output speed from the transmission, there are provided operator-controlled, solenoid-operated mechanisms for selectively restraining the respective spring clutches against rotation when desired. Such control mechanisms and the control circuit therefor are shown schematically in Fig. 1.

As indicated in Fig. 1, the helical spring clutch 24 at one end is formed with an integral outwardly extending finger or protrusion 24a. This protrusion on the spring clutch is positioned to be engaged by a stop arm 80 which is here shown as pivoted at its middle on a support bracket 81. A tension spring 82 normally biases stop arm 80 away from engagement with spring clutch protrusion 24a, at which time spring clutch 24 rotates with hub 25 and connects gear 22 directly to input shaft 15. However, when solenoid coil 83 is energized it draws stop arm 80 clockwise in Fig. 1 against the bias of spring 82 and positions the outer end of the stop arm at a location to engage the spring clutch protrusion 24a and restrain the helical spring clutch 24 against rotation with hub 25, thereby disconnecting the direct connection from input shaft 15 to gear 22. Of course, it is to be understood that the mechanism for restraining the helical spring clutch 24 against rotation may take various forms different from that illustrated schematically in Fig. 1 without departing from the spirit and scope of the present invention.

In the control circuit of Fig. 1, each of the push button operated switches 101, 103, 105 and 107 controls the energization of solenoid coil 83 from power source 100. Line 108 interconnects one end of solenoid coil 83 and one side of the power source 100. The fixed terminals 101a, 103a, 105a and 107a of the respective switches are connected through line 110 to the other side of power source 100 while line 109 leads from the opposite end of solenoid coil 83 to the other fixed terminals 101b, 103b, 105b and 107b of these switches. Shorting bars 111, 113, 115 and 117 suitably connected mechanically to the respective push buttons 121, 123, 125, and 127 for the switches 101, 103, 105, and 107 are positioned to bridge the respective pairs of switch contacts 101a and 101b, 103a and 103b, 105a and 105b, and 107a and 107b when the respective push buttons are depressed manually by the operator. Thus, when any one of these push buttons is depressed, solenoid coil 83 is energized from the power source 100.

Similarly, the control for spring clutch 40 includes a pivoted stop arm 85 operative to be moved clockwise in Fig. 1 by the energization of solenoid coil 86 to engage the protruding finger 40a on spring clutch 40 and thereby restrain spring 40 against rotation with hub 27. Tension spring 87 normally biases stop arm 85 away from engagement with the spring clutch protrusion 40a.

In the energization circuit for solenoid coil 86, line 118 connects one end of the coil to one side of power source 100. Line 119 leads from the opposite end of solenoid coil 86 to the fixed terminals 101c, 102c, 105c and 106c of switches 101, 102, 105 and 106, respectively. The corresponding other fixed terminals 101d, 102d, 105d and 106d of these switches are connected respectively through lines 120 and 110 to the other side of power source 100. Shorting bar 131 of switch 101 is suitably mechanically connected to push button 121 and bridges the fixed contacts 101c and 101d of this switch when this push button is depressed. Likewise, shorting bar 132 of switch 102 bridges the fixed contacts 102c and 102d of this switch when push button 122 is depressed, shorting bar 135 of switch 105 bridges the fixed contacts 105c and 105d of this switch when push button 125 is depressed, and shorting bar 136 of switch 106 bridges the fixed contacts 106c and 106d of this switch when push button 126 is depressed.

Thus, solenoid coil 86 is energized from power source 100 when any of the push buttons 121, 122, 125 or 126 is depressed.

In like manner, spring clutch 76 is controlled by mechanism which includes a pivoted stop arm 88 which moves clockwise in Fig. 1 when solenoid coil 89 is energized, to engage the protrusion 76a on helical spring clutch 76 and restrain spring clutch 76 against rotation. Tension spring 90 normally biases stop arm 88 away from engagement with the spring clutch protrusion 76a.

The energization circuit for solenoid coil 89 includes a line 91 interconnecting one side of coil 89 and line 108 which leads to one side of power source 100. Line 92 leads from the other end of solenoid coil 89 to the fixed terminals 101e, 102e, 103e and 104e of switches 101, 102, 103 and 104, respectively. The corresponding other fixed terminals 101f, 102f, 103f and 104f of these switches are connected respectively through lines 93, 110, 120 and 110 to the other side of power source 100. Shorting bar 141 of switch 101 is mechanically coupled to push button 121 so that when this push button is depressed the switch contacts 101e and 101f are bridged and solenoid coil 89 is energized from power source 100. Also, shorting bar 142 of switch 102 bridges the fixed terminals 102e and 102f of this switch when push button 122 is depressed, shorting bar 143 of switch 103 bridges the fixed terminals 103e and 103f of this switch when push button 123 is depressed, and shorting bar 144 of switch 104 bridges the fixed contacts 104e and 104f of this switch when push button 124 is depressed.

Thus, solenoid 89 is energized when any one of the push buttons 121, 122, 123 or 124 is depressed.

With the foregoing control arrangement, it will be readily understood that the lowest speed drive to the output shaft 71 is established when push button 121 is depressed. At this time, each of the solenoid coils 83, 86 and 89 is energized so that the drive from input shaft 15 to first intermediate shaft 19 is through the 1:2 reduction gearing 17, 18, the drive from first intermediate shaft 19 to second intermediate shaft 45 is through the 1:5 reduction gearing 49, 50, and the drive from second intermediate shaft 45 to gear 68 is through the 1:25 reduction gearing 60, 61, 63, 64. Thus, the speed of output shaft 71 is 1/250 of the speed of input shaft 15.

For the next highest output speed, push button 122 alone is depressed, thereby energizing each of solenoid coils 86 and 89. At this time, the drive from input shaft 15 to first intermediate shaft 19 is through helical spring clutch 24 and gears 22, 26, so that no speed reduction occurs between these shafts. The drive from first intermediate shaft 19 to second intermediate shaft 45 is through the 1:5 reduction gearing 49, 50, and the drive from second intermediate shaft 45 to gear 68 is through the 1:25 reduction gearing 60, 61, 63, 64. Thus, the speed of output shaft is 1/125 that of input shaft 15, or twice the lowest output speed.

In the next highest speed, only push button 123 is depressed, thereby energizing solenoid coils 83 and 89. When this occurs, the drive from input shaft 15 is through the 1:2 reduction gearing 17, 18 to the first intermediate shaft 19. The drive from first intermediate shaft 19 to second intermediate shaft 45 is through helical spring clutch 40 and gears 42, 43, so that no speed reduction takes place between the first and second intermediate shafts at this time. The drive from second intermediate shaft 45 to gear 68 is through the 1:25 reduction gearing 60, 61, 63, 64. Thus, the speed of output shaft 71 is 1/50 that of the input shaft 15, or five times the lowest output speed.

In the next highest speed, only push button 124 is depressed, thereby energizing solenoid coil 89. At this time, the drive from input shaft 15 to first intermediate shaft 19 is through helical spring clutch 24 and gears 22, 26, and the drive from first intermediate shaft 19 to second intermediate shaft 45 is through helical spring clutch 40 and gears 42, 43. Thus, there is no speed reduction between input shaft 15 and the second intermediate shaft 45. The drive from shaft 45 to gear 68 is through the 1:25 reduction gearing 60, 61, 63, 64. With this arrangement, the speed of output shaft 71 is 1/25 that of input shaft 15, or ten times the lowest output speed.

For the next highest speed, push button 125 alone is depressed, thereby energizing solenoid coils 83 and 86. Thus, the drive from input shaft 15 to first intermediate shaft 19 is through the 1:2 reduction gearing 17, 18, and the drive from first intermediate shaft 19 to second intermediate shaft 45 is through the 1:5 reduction gearing 49, 50. The drive from second intermediate shaft 45 to gear 68 is through helical spring clutch 76, so that no speed reduction occurs here. The speed of output shaft is therefore 1/10 that of input shaft 15, or twenty-five times the lowest output speed.

In the next highest speed, push button 126 alone is depressed, thereby energizing solenoid coil 86. The drive from input shaft 15 to first intermediate shaft 19 at this time is through helical spring clutch 24 and gears 22, 26, so that no speed reduction takes place between these shafts. The drive from first intermediate shaft 19 to second intermediate shaft 45 is through the 1:5 reduction gearing 49, 50. The drive from second intermediate shaft 45 to gear 68 is through helical spring clutch 76, so that no speed reduction takes place between these elements. Therefore, the speed of output shaft 71 is 1/5 that of input shaft 15, or fifty times the lowest output speed.

In the next to the highest output speed, push button 127 only is depressed, thereby energizing solenoid coil 83. The drive from input shaft 15 to first intermediate shaft 19 is through the 1:2 reduction gearing 17, 18. The drive from first intermediate shaft 19 and second intermediate shaft 45 is through helical spring clutch 40 and gears 42, 43, and the drive from second intermediate shaft 45 to gear 68 is through helical spring clutch 76, so that no speed reduction takes place between the first intermediate shaft 19 and gear 68. The speed of output shaft 71 is therefore one-half that of input shaft 15, or one hundred twenty-five times the lowest output speed.

For the highest output speed, none of the push buttons is depressed. Therefore, the drive from input shaft 15 to first intermediate shaft 19 occurs without speed reduction through helical spring clutch 24 and gears 22, 26, the drive from first intermediate shaft 19 to second intermediate shaft 45 occurs without speed reduction through helical spring clutch 40 and gears 42, 43, and the drive from second intermediate shaft 45 to gear 68 takes place without speed reduction through helical spring clutch 76. Thus, there is no speed reduction between the input and output shafts 15 and 71, and this highest output speed is two hundred fifty times the lowest output speed.

From the foregoing, it will be readily apparent that the novel construction of the present transmission adapts it particularly for easy assembly without substantial difficulty as to manufacturing tolerances. All that is required is that the respective end plate holes 12, 21, 48 and 74 be appropriately located and aligned, so as to properly locate the two axes of rotation in the transmission formed by the coaxial pairs of shafts 19, 71 and 15, 45. Beyond this, it is necessary merely to maintain proper concentricities of the interfitting shafts and the gears and hubs on the respective shafts, which is relatively simple.

It will be noted further that the operation of the helical spring clutches to either connect the respective shafts directly to the corresponding gears or to disconnect them is not opposed by the load on the transmission. The operating forces required to restrain these spring clutches against rotation, or to remove such restraints against rotation, are quite small and therefore require no powerful operating mechanism for this purpose. This is particularly advantageous herein because it enables the use of the simple remote controlled solenoid latch arrangement for controlling the operation of these spring clutches, as described.

While in the foregoing description and the accompanying drawing there is disclosed a particular preferred embodiment of the present invention, it is to be understood that various modifications, omissions and refinements which depart from the illustrated mechanism may be adopted without departing from the spirit and scope of the present invention. For example, the particular solenoid-operated arrangements for restraining the helical spring clutches against rotation may be replaced by other suitable devices capable of performing the same functions, and the overrunning clutches are susceptible of many embodiments different from the particular form shown in Fig. 2.

What is claimed is:

1. A variable speed drive comprising a rotary drive shaft, a rotary first intermediate shaft, a first gear mounted on said drive shaft, a second gear mounted on said first intermediate shaft to rotate therewith and meshing with said first gear, a first operator-controlled clutch acting between said drive shaft and said first gear to selectively establish a direct drive from the drive shaft to the first gear or to disengage the drive shaft from direct driving relationship with the first gear, first reduction gearing means mounted on said drive shaft and said first intermediate shaft and driven from said drive shaft, a first overrunning clutch acting between said first reduction gearing means and said first intermediate shaft to drive said first intermediate shaft through said first reduction gearing means from the drive shaft when said first operator-controlled clutch disconnects the direct drive between the drive shaft and said first gear and enabling said first intermediate shaft to overrun said first reduction gearing means when driven from the drive shaft through said first and second gears when said first operator-controlled clutch establishes the direct drive from the drive shaft to the first gear, a rotary second intermediate shaft interfitting rotatably with said drive shaft, a third gear mounted on said first intermediate shaft, a fourth gear mounted on said second intermediate shaft to rotate therewith and meshing with said third gear, a second operator-controlled clutch acting between said first intermediate shaft and said third gear to selectively establish a direct drive from said first intermediate shaft to said third gear or to disengage said first intermediate shaft from direct driving relationship with said third gear, second reduction gearing means mounted on said first and second intermediate shafts and driven from said first intermediate shaft, a second overrunning clutch acting between said second reduction gearing means and said second intermediate shaft to drive said second intermediate shaft through said second reduction gearing means from said first intermediate shaft when said second operator-controlled clutch disconnects the direct drive between said first intermediate shaft and said third gear and enabling said second intermediate shaft to overrun said second reduction gearing means when driven from said first intermediate shaft through said third and fourth gears when said second operator-controlled clutch establishes the direct drive from said first intermediate shaft to the third gear, a rotary output shaft interfitting rotatably with said first intermediate shaft, a fifth gear mounted on said second intermediate shaft, a sixth gear mounted on said output shaft to rotate therewith and meshing with said fifth gear, a third operator-controlled clutch acting between said second intermediate shaft and said fifth gear to selectively establish a direct drive from the second intermediate shaft to the fifth gear or to disengage the second intermediate shaft from direct driving relationship with the fifth gear, third reduction gearing means mounted on said first and second intermediate shafts and driven from said second intermediate shaft, and a third overrunning clutch acting between said third reduction gearing means and said fifth gear to drive said output shaft through said third reduction gearing means and said fifth and sixth gears from said second intermediate shaft when said third operator-controlled clutch disconnects the direct drive between the second intermediate shaft and the fifth gear and enabling said fifth gear and said output shaft to overrun said third reduction gearing means when said third operator-controlled clutch establishes the direct drive from the second intermediate shaft to the fifth gear.

2. A variable speed drive comprising a rotary drive shaft, a rotary first intermediate shaft, a first gear mounted on said drive shaft, a second gear mounted on said first intermediate shaft to rotate therewith and meshing with said first gear, a first operator-controlled clutch acting between said drive shaft and said first gear to selectively establish a direct drive from the drive shaft to the first gear or to disengage the drive shaft from direct driving relationship with the first gear, first reduction gearing means mounted on said drive shaft and said first intermediate shaft and driven from said drive shaft, a first overrunning clutch acting between said first reduction gearing means and said first intermediate shaft to drive said first intermediate shaft through said first reduction gearing means from the drive shaft when said first operator-controlled clutch disconnects the direct drive between the drive shaft and said first gear and enabling said first intermediate shaft to overrun said first reduction gearing means when driven from the drive shaft through said first and second gears when said first operator-controlled clutch establishes the direct drive from the drive shaft to the first gear, a rotary second intermediate shaft interfitting rotatably with said drive shaft, a third gear mounted on said first intermediate shaft, a fourth gear mounted on said second intermediate shaft to rotate therewith and meshing with said third gear, a second operator-controlled clutch acting between said first intermediate shaft and said third gear to selectively establish a direct drive from said first intermediate shaft to said third gear or to disengage said first intermediate shaft from direct driving relationship with said third gear, second reduction gearing means mounted on said first and second intermediate shafts and driven from said first intermediate shaft, a second overrunning clutch acting between said second reduction gearing means and said second intermediate shaft to drive said second intermediate shaft through said second reduction gearing means from said first intermediate shaft when said second operator-controlled clutch disconnects the direct drive between said first intermediate shaft and said third gear and enabling said second intermediate shaft to overrun said second reduction gearing means when driven from said first intermediate shaft through said third and fourth gears when said second operator-controlled clutch establishes the direct drive from said first intermediate shaft to the third gear, a rotary output shaft interfitting rotatably with said first intermediate shaft, a fifth gear driven from said second intermediate shaft and in driving relation with said output shaft, a third operator-controlled clutch acting between said second intermediate shaft and said fifth gear to selectively establish a direct drive from the second intermediate shaft to the fifth gear or to disengage the second intermediate shaft from direct driving relationship with the fifth gear; third reduction gearing means driven from said second intermediate shaft, and a third overrunning clutch acting between said third reduction gearing means and said output shaft to drive said output shaft through said third reduction gearing means from said second intermediate shaft when said third operator-controlled clutch disconnects the direct drive between the second intermediate shaft and the fifth gear and enabling said output shaft to overrun said third reduction gearing means when said third operator-controlled clutch establishes the direct drive from the second intermediate shaft to the fifth gear.

3. A variable speed drive comprising a rotary drive shaft, a rotary first intermediate shaft extending parallel to said drive shaft in spaced relation therefrom, a first gear mounted on said drive shaft, a second gear mounted on said first intermediate shaft to rotate therewith and meshing with said first gear, a first operator-controlled clutch acting between said drive shaft and said first gear to selectively establish a direct drive from the drive shaft to the first gear or to disengage the drive shaft from direct driving relationship with the first gear, first reduction gearing means mounted on said drive shaft and said first intermediate shaft and driven from said drive shaft, a first overrunning clutch acting between said first reduction gearing means and said first intermediate shaft to drive said first intermediate shaft through said first reduction gearing means from the drive shaft when said first operator-controlled clutch disconnects the direct drive between the drive shaft and said first gear and enabling said first intermediate shaft to overrun said first reduction gearing means when driven from the drive shaft through said first and second gears when said first operator-controlled clutch establishes the direct drive from the drive shaft to the first gear, a rotary second intermediate shaft interfitting rotatably with said drive shaft and extending coaxial therewith, a third gear mounted on said first intermediate shaft, a fourth gear mounted on said second intermediate shaft to rotate therewith and meshing with said third gear, a second operator-controlled clutch acting between said first intermediate shaft and said third gear to selectively establish a direct drive from said first intermediate shaft to said third gear or to disengage said first intermediate shaft from direct driving relationship with said third gear, second reduction gearing means mounted on said first and second intermediate shafts and driven from said first intermediate shaft, a second overrunning clutch acting between said second reduction gearing means and said second intermediate shaft to drive said second intermediate shaft through said second reduction gearing means from said first intermediate shaft when said second operator-controlled clutch disconnects the direct drive between said first intermediate shaft and said third gear and enabling said second intermediate shaft to overrun said second reduction gearing means when driven from said first intermediate shaft through said third and fourth gears when said second operator-controlled clutch establishes the direct drive from said first intermediate shaft to the third gear, a rotary output shaft interfitting rotatably with said first intermediate shaft and extending coaxial therewith, a pair of spaced end plates each formed with spaced holes receiving, respectively, the assembly of the drive shaft and the second intermediate shaft and the assembly of the first intermediate shaft and the output shaft, a fifth gear mounted on said second intermediate shaft, a sixth gear mounted on said output shaft to rotate therewith and meshing with said fifth gear, a third operator-controlled clutch acting between said second intermediate shaft and said fifth gear to selectively establish a direct drive from the second intermediate shaft to the fifth gear or to disengage the second intermediate shaft from direct driving relationship with the fifth gear, third reduction gearing means mounted on said first and second intermediate shafts and driven from said second intermediate shaft, and a third overrunning clutch acting between said third reduction gearing means and said fifth gear to drive said output shaft through said third reduction gearing means and said fifth and sixth gears from said second intermediate shaft when said third operator-controlled clutch disconnects the direct drive between the second intermediate shaft and the fifth gear and enabling said fifth and sixth gears and said output shaft to overrun said third reduction gearing means when said third operator-controlled clutch establishes the direct drive from the second intermediate shaft to the fifth gear.

4. A variable speed drive comprising a rotary drive shaft, a rotary first intermediate shaft, a first gear mounted on said drive shaft, a second gear mounted on said first intermediate shaft to rotate therewith and meshing with said first gear, a first helical spring clutch acting between said drive shaft and said first gear to impart a direct drive from the drive shaft to the first gear when rotated in unison with the drive shaft, first operator-controlled mechanism for restraining said first spring clutch against rotation with the drive shaft to disconnect the direct drive between the drive shaft and the first gear, first reduction gearing means mounted on said drive shaft and said first intermediate shaft and driven from said drive shaft, a first overrunning clutch acting between said first reduction gearing means and said first intermediate shaft to drive said first intermediate shaft through said first reduction gearing means from the drive shaft when said first spring clutch disconnects the direct drive between the drive shaft and said first gear and enabling said first intermediate shaft to overrun said first reduction gearing means when driven from the drive shaft through said first and second gears when said first spring clutch establishes the direct drive from the drive shaft to the first gear, a rotary second intermediate shaft interfitting rotatably with said drive shaft, a third gear mounted on said first intermediate shaft, a fourth gear mounted on said second intermediate shaft to rotate therewith and meshing with said third gear, a second helical spring clutch acting between said first intermediate shaft and said third gear to impart a direct drive from said first intermediate shaft to said third gear when rotated in unison with said first intermediate shaft, second operator-controlled mechanism for restraining said second spring clutch against rotation with said first intermediate shaft to disconnect the direct drive between said first intermediate shaft and said third gear, second reduction gearing means mounted on said first and second intermediate shafts and driven from said first intermediate shaft, a second overrunning clutch acting between said second reduction gearing means and said second intermediate shaft to drive said second intermediate shaft through said second reduction gearing means from said first intermediate shaft when said second spring clutch disconnects the direct drive between said first intermediate shaft and said third gear and enabling said second intermediate shaft to overrun said second reduction gearing means when driven from said first intermediate shaft through said third and fourth gears when said second spring clutch establishes the direct drive from said first intermediate shaft to the third gear, a rotary output shaft interfitting rotatably with said first intermediate shaft, a fifth gear mounted on said second intermediate shaft, a sixth gear mounted on said output shaft to rotate therewith and meshing with said fifth gear, a third helical spring clutch acting between said second intermediate shaft and said fifth gear to impart a direct drive from the second intermediate shaft to the fifth gear when rotated in unison with said second intermediate shaft, third operator-controlled mechanism for restraining said third spring clutch against rotation with said second intermediate shaft to disconnect the direct drive between the second intermediate shaft and the fifth gear, third reduction gearing means mounted on said first and second intermediate shafts and driven from said second intermediate shaft, and a third overrunning clutch acting between said third reduction gearing means and said fifth gear to drive said output shaft through said third reduction gearing means and said fifth and sixth gears from said second intermediate shaft when said third spring clutch disconnects the direct drive between the second intermediate shaft and the fifth gear and enabling said fifth and sixth gears and said output shaft to overrun said third reduction gearing means when said third spring clutch establishes the direct drive from the second intermediate shaft to the fifth gear.

5. A variable speed drive comprising a rotary drive shaft, a rotary first intermediate shaft extending parallel to said drive shaft in spaced relation therefrom, a first gear mounted on said drive shaft, a second gear mounted on said first intermediate shaft to rotate therewith and meshing with said first gear, a first helical spring clutch acting between said drive shaft and said first gear to impart a direct drive from the drive shaft to the first gear when rotated in unison with the drive shaft, first operator-controlled mechanism for restraining said first spring clutch against rotation with the drive shaft to disconnect the direct drive between the drive shaft and the first gear, first reduction gearing means mounted on said drive shaft and said first intermediate shaft and driven from said drive shaft, a first overrunning clutch acting between said first reduction gearing means and said first intermediate shaft to drive said first intermediate shaft through said first reduction gearing means from the drive shaft when said first spring clutch disconnects the direct drive between the drive shaft and said first gear and enabling said first intermediate shaft to overrun said first reduction gearing means when driven from the drive shaft through said first and second gears when said first spring clutch establishes the direct drive from the drive shaft to the first gear, a rotary second intermediate shaft interfitting rotatably with said drive shaft and extending coaxial therewith, a third gear mounted on said first intermediate shaft, a fourth gear mounted on said second intermediate shaft to rotate therewith and meshing with said third gear, a second helical spring clutch acting between said first intermediate shaft and said third gear to impart a direct drive from said first intermediate shaft to said third gear when rotated in unison with said first intermediate shaft, second operator-controlled mechanism for restraining said second spring clutch against rotation with said first intermediate shaft to disconnect the direct drive between said first intermediate shaft and said third gear, second reduction gearing means mounted on said first and second intermediate shafts and driven from said first intermediate shaft, a second overrunning clutch acting between said second reduction gearing means and said second intermediate shaft to drive said second intermediate shaft through said second reduction gearing means from said first intermediate shaft when said second spring clutch disconnects the direct drive between said first intermediate shaft and said third gear and enabling said second intermediate shaft to overrun said second reduction gearing means when driven from said first intermediate shaft through said third and fourth gears when said second spring clutch establishes the direct drive from said first intermediate shaft to the third gear, a rotary output shaft interfitting rotatably with said first intermediate shaft and extending coaxial therewith, a pair of spaced end plates each formed with spaced holes receiving, respectively, the assembly of the drive shaft and the second intermediate shaft and the assembly of the first intermediate shaft and the output shaft, a fifth gear mounted on said second intermediate shaft, a sixth gear mounted on said output shaft to rotate therewith and meshing with said fifth gear, a third helical spring clutch acting between said second intermediate shaft and said fifth gear to impart a direct drive from the second intermediate shaft to the fifth gear when rotated in unison with said second intermediate shaft, third operator-controlled mechanism for restraining said third spring clutch against rotation with said second intermediate shaft to disconnect the direct drive between the second intermediate shaft and the fifth gear, third reduction gearing means mounted on said first and second intermediate shafts and driven from said second intermediate shaft, and a third overrunning clutch acting between said third reduction gearing means and said fifth gear to drive said output shaft through said third reduction gearing means and said fifth and sixth gears from said second intermediate shaft when said third spring clutch disconnects the direct drive between the second intermediate shaft and the fifth gear and enabling said fifth and sixth gears and said output shaft to overrun said third reduction gearing means when said third spring clutch establishes the direct drive from the second intermediate shaft to the fifth gear.

6. A variable speed drive assembly comprising a pair of spaced apart support walls formed with aligned pairs of apertures, a rotary drive shaft supported rotatably at one of the apertures in one of said support walls, a rotary first intermediate shaft supported rotatably at the other aperture in said one support wall and extending parallel to the drive shaft, a rotary second intermediate shaft interfitting rotatably with the drive shaft and supported rotatably at one of the apertures in the other of said support walls to have the same axis of rotation as the drive shaft, a rotary driven shaft interfitting rotatably with the first intermediate shaft and supported rotatably at the other aperture in said other support wall to have the same axis of rotation as said first intermediate shaft, a plurality of different sized pairs of meshing rotary gears mounted on the shafts with the meshing gears of each pair mounted for rotation about said axes of rotation, respectively, and means to selectively establish different drives through the gears from the drive shaft to the driven shaft, said rotary first and second intermediate shafts extending from one of said support walls to the other said support wall.

7. A variable speed transmission comprising a pair of spaced apart support walls formed with aligned pairs of apertures, a rotary drive shaft supported rotatably at one of the apertures in one of said support walls, a rotary first intermediate shaft supported rotatably at the other aperture in said one support wall and extending parallel to the drive shaft, a rotary second intermediate shaft interfitting rotatably with the drive shaft and supported rotatably at one of the apertures in the other of said support walls to have the same axis of rotation as the drive shaft, a rotary driven shaft interfitting rotatably with the first intermediate shaft and supported rotatably at the other aperture in said other support wall to have the same axis of rotation as the first intermediate shaft, a plurality of different sized pairs of meshing rotary gears mounted on the shafts with the meshing gears of each pair mounted for rotation about said axes of rotation, respectively, said plurality of pairs of gears including a series of pairs of gears in which one of the gears of each pair is secured fixedly to the shaft on which it is mounted and the other gear of that pair is rotatable on the shaft on which it is mounted, and a series of clutches respectively acting between said other gear of each pair in the series and the shaft on which each said other gear is mounted for alternatively coupling together each said other gear and the shaft on which it is mounted or disconnecting each said other gear and the shaft on which it is mounted to thereby establish different drives through the gears from the drive shaft to the driven shaft, said rotary first and second intermediate shafts extending from one of said support walls to the other said support wall.

8. A variable speed drive comprising a rotary drive shaft, a rotary first intermediate shaft, a first gear mounted on said drive shaft, a second gear mounted on said first intermediate shaft to rotate therewith and meshing with said first gear, a first operator-controlled clutch acting between said drive shaft and said first gear to selectively establish a direct drive from the drive shaft to the first gear or to disengage the drive shaft from direct driving relationship with the first gear, first reduction gearing means mounted on said drive shaft and said first intermediate shaft and driven from said drive shaft, a first overrunning clutch acting between said first reduction gearing means and said first intermediate shaft to drive said first intermediate shaft through said first reduction gearing means from the drive shaft when said first operator-controlled clutch disconnects the direct drive between the drive shaft and said first gear and enabling said first intermediate shaft to overrun said first reduction gearing means when driven from the drive shaft through said first and second gears when said first operator-controlled clutch establishes the direct drive from the drive shaft to the first gear, a rotary second intermediate shaft, a third gear mounted on said first intermediate shaft, a fourth gear mounted on said second intermediate shaft to rotate therewith and meshing with said third gear, a second operator-controlled clutch acting between said first intermediate shaft and said third gear to selectively establish a direct drive from said first intermediate shaft to said third gear or to disengage said first intermediate shaft from direct driving relationship with said third gear, second reduction gearing means mounted on said first and second intermediate shafts and driven from said first intermediate shaft, a second overrunning clutch acting between said second reduction gearing means and said second intermediate shaft to drive said second intermediate shaft through said second reduction gearing means from said first intermediate shaft when said second operator-controlled clutch disconnects the direct drive between said first intermediate shaft and said third gear and enabling said second intermediate shaft to overrun said second reduction gearing means when driven from said first intermediate shaft through said third and fourth gears when said second operator-controlled clutch establishes the direct drive from said first intermediate shaft to the third gear, a rotary output shaft, a fifth gear driven from said second intermediate shaft and in driving relation with said output shaft, a third operator-controlled clutch acting between said second intermediate shaft and said fifth gear to selectively establish a direct drive from the second intermediate shaft to the fifth gear or to disengage the second intermediate shaft from direct driving relationship with the fifth gear, third reduction gearing means driven from said second intermediate shaft, and a third overrunning clutch acting between said third reduction gearing means and said output shaft to drive said output shaft through said third reduction gearing means from said second intermediate shaft when said third operator-controlled clutch disconnects the direct drive between the second intermediate shaft and the fifth gear and enabling said output shaft to overrun said third reduction gearing means when said third operator-controlled clutch establishes the direct drive from the second intermediate shaft to the fifth gear.

9. A variable speed drive comprising a rotary drive shaft, a rotary first intermediate shaft, a first gear mounted on said drive shaft, a second gear mounted on said first intermediate shaft to rotate therewith and meshing with said first gear, a first operator-controlled clutch acting between said drive shaft and said first gear to selectively establish a direct drive from the drive shaft to the first gear or to disengage the drive shaft from direct driving relationship with the first gear, first reduction gearing means driven from said drive shaft, a first overrunning clutch acting between said first reduction gearing means and said first intermediate shaft to drive said first intermediate shaft through said first reduction gearing means from the drive shaft when said first operator-controlled clutch disconnects the direct drive between the drive shaft and said first gear and enabling said first intermediate shaft to overrun said first reduction gearing means when driven from the drive shaft through said first and second gears when said first operator-controlled clutch establishes the direct drive from the drive shaft to the first gear, a rotary second intermediate shaft, a third gear mounted on said first intermediate shaft, a fourth gear mounted on said second intermediate shaft to rotate therewith and meshing with said third gear, a second operator-controlled clutch acting between said first intermediate shaft and said third gear to selectively establish a direct drive from said first intermediate shaft to said third gear or to disengage said first intermediate shaft from direct driving relationship with said third gear, second reduction gearing means driven from said first intermediate shaft, a second overrunning clutch acting between said second reduction gearing means and said second intermediate shaft to drive said second intermediate shaft through said second reduction gearing means from said first intermediate shaft when said second operator-controlled clutch disconnects the direct drive between said first intermediate shaft and said third gear and enabling said second intermediate shaft to overrun said second reduction gearing means when driven from said first intermediate shaft through said third and fourth gears when said second operator-controlled clutch establishes the direct drive from said first intermediate shaft to the third gear, a rotary output shaft, a fifth gear driven from said second intermediate shaft and in driving relation with said output shaft, a third operator-controlled clutch acting between said second intermediate shaft and said fifth gear to selectively establish a direct drive from the second intermediate shaft to the fifth gear or to disengage the second intermediate shaft from direct driving relationship with the fifth gear, third reduction gearing means driven from said second intermediate shaft, and a third overrunning clutch acting between said third reduction gearing means and said output shaft to drive said output shaft through said third reduction gearing means from said second intermediate shaft when said third operator-controlled clutch disconnects the direct drive between the second intermediate shaft and the fifth gear and enabling said output shaft to overrun said third reduction gearing means when said third operator-controlled clutch establishes the direct drive from the second intermediate shaft to the fifth gear.

10. A variable speed drive comprising a rotary drive shaft, a rotary first intermediate shaft, a first gear adapted to be driven from said drive shaft, a second gear mounted on said first intermediate shaft to rotate therewith and meshing with said first gear, a first operator-controlled clutch acting between said drive shaft and said first gear to selectively establish a drive from the drive shaft to the first gear or to disengage the drive shaft from driving relationship with the first gear, first reduction gearing means driven from said drive shaft, a first over-running clutch acting between said first reduction gearing means and said first intermediate shaft to drive said first intermediate shaft through said first reduction gearing means from the drive shaft when said first operator-controlled clutch disconnects the drive between the drive shaft and said first gear and enabling said first intermediate shaft to overrun said first reduction gearing means when driven from the drive shaft through said first and second gears when said first operator-controlled clutch establishes the drive from the drive shaft to the first gear, a rotary second intermediate shaft, a third gear adapted to be driven from said first intermediate shaft, a fourth gear mounted on said second intermediate shaft to rotate therewith and meshing with said third gear, a second operator-controlled clutch acting between said first intermediate shaft and said third gear to selectively establish a drive from said first intermediate shaft to said third gear or to disengage said first intermediate shaft from driving relationship with said third gear, second reduction gearing means driven from said first intermediate shaft, a second overrunning clutch acting between said second reduction gearing means and said second intermediate shaft to drive said second intermediate shaft through said second reduction gearing means from said first intermediate shaft when said second operator-controlled clutch disconnects the drive between said first intermediate shaft and said third gear and enabling said second intermediate shaft to overrun said second reduction gearing means when driven from said first intermediate shaft through said third and fourth gears when said second operator-controlled clutch establishes the drive from said first intermediate shaft to the third gear, a rotary output shaft, a fifth gear driven from said second intermediate shaft and in driving relation with said output shaft, a third operator-controlled clutch acting between said second intermediate shaft and said fifth gear to selectively establish a direct drive from the second intermediate shaft to the fifth gear or to disengage the second intermediate shaft from direct driving relationship with the fifth gear, third reduction gearing means driven from said second intermediate shaft, and a third overrunning clutch acting between said third reduction gearing means and said output shaft to drive said output shaft through said third reduction gearing means from said second intermediate shaft when said third operator-controlled clutch disconnects the direct drive between the second intermediate shaft and the fifth gear and enabling said output shaft to overrun said third reduction gearing means when said third operator-controlled clutch establishes the direct drive from the second intermediate shaft to the fifth gear.

11. In a variable speed drive, the combination of a rotary shaft, a drive gear mounted on said shaft and adapted to be driven directly thereby, an operator-controlled clutch acting between said shaft and said drive gear and operable selectively to connect said drive gear directly to said shaft or alternatively to disconnect the shaft from direct drive relationship with said drive gear, reduction gearing means driven from said shaft and including a final gear mounted rotatably on said shaft, and an over-running clutch acting between said final gear and said drive gear to drive said drive gear through the reduction gearing from the shaft when said operator-controlled clutch disconnects the direct drive between the shaft and the drive gear and permitting said drive gear to overrun said final gear when said operator-controlled clutch connects the drive gear directly to the shaft.

12. In a variable speed drive, the combination of a rotary driving shaft, a rotary output shaft spaced from said driving shaft, a first intermediate shaft interfitting rotatably with said output shaft and extending coaxial therewith, a drive gear mounted on said driving shaft and adapted to be driven directly thereby, a driven gear having a connection to said output shaft and meshing with said drive gear to be driven thereby, a helical spring clutch acting between the driving shaft and the drive gear to connect the driving shaft directly to the drive gear when rotated in unison with the driving shaft, operator-controlled means for restraining the spring clutch against rotation with the driving shaft to disconnect said direct connection between the driving shaft and the drive gear, a reduction gearing comprising a plurality of gears mounted rotatably on the driving shaft and said first intermediate shaft and including a final gear mounted on the driving shaft, and an overrunning clutch acting between said final gear and the drive gear to drive said drive gear through the reduction gearing from the driving shaft when the spring clutch is restrained against rotation and permitting the drive gear to overrun said final gear when the spring clutch connects the driving shaft directly to the drive gear.

13. A variable speed drive assembly comprising a pair of spaced apart support walls formed with only two pairs of apertures, a rotary drive shaft supported rotatably at one of the apertures in one of said support walls, a rotary first intermediate shaft supported rotatably at the other aperture in said one support wall and extending parallel to the drive shaft, a rotary second intermediate shaft interfitting rotatably with the drive shaft and supported rotatably at one of the apertures in the other of said support walls to have the same axis of rotation as the drive shaft, a rotary driven shaft interfitting rotatably with the first intermediate shaft and supported rotatably at the other aperture in said other support wall to have the same axis of rotation as said first intermediate shaft, a plurality of different sized pairs of meshing rotary gears mounted on the two shafts with the meshing gears of each pair mounted for rotation about said axes of rotation respectively, and means to selectively establish different drives through the gears from the drive shaft to the driven shaft, said rotary first and second intermediate shafts extending from one of said support walls to the other said support wall.

14. A variable speed drive assembly comprising a pair of spaced apart support walls formed with only two pairs of apertures, a rotary drive shaft supported rotatably at one of the apertures in one of said support walls, a rotary first intermediate shaft supported rotatably at the other aperture in said one support wall and extending parallel to the drive shaft, a rotary second intermediate shaft interfitting rotatably with the drive shaft and supported rotatably at one of the apertures in the other of said support walls to have the same axis of rotation as the drive shaft, a rotary driven shaft interfitting rotatably with the first intermediate shaft and supported rotatably at the other aperture in said other support wall to have the same axis of rotation as said first intermediate shaft, a plurality of different sized pairs of meshing rotary gears mounted on the two shafts with the meshing gears of each pair mounted for rotation about said axes of rotation respectively, and means to selectively establish different drives through the gears from the drive shaft to the driven shaft.

References Cited in the file of this patent

UNITED STATES PATENTS

| | | |
|---|---|---|
| 864,824 | Barnes | Sept. 3, 1907 |
| 1,861,931 | Moldenhaver | June 7, 1932 |
| 2,456,600 | Trout | Dec. 14, 1948 |
| 2,461,027 | Bodmer | Feb. 8, 1949 |
| 2,622,450 | Gorske | Dec. 23, 1952 |
| 2,660,899 | McCammon | Dec. 1, 1953 |
| 2,694,939 | Schmitter | Nov. 23, 1954 |